US006967547B2

(12) United States Patent
Pellegrini et al.

(10) Patent No.: US 6,967,547 B2
(45) Date of Patent: Nov. 22, 2005

(54) RF SWITCH INCLUDING DIODES WITH INTRINSIC REGIONS

(75) Inventors: Massimo M. Pellegrini, Metheun, MA (US); David C. Riffelmacher, Gloucester, MA (US)

(73) Assignee: Signal Technology Corporation, Beverly, MA (US)

( * ) Notice: Subject to any disclaimer, the term of this patent is extended or adjusted under 35 U.S.C. 154(b) by 0 days.

(21) Appl. No.: 10/178,929

(22) Filed: Jun. 24, 2002

(65) Prior Publication Data

US 2003/0234708 A1 Dec. 25, 2003

(51) Int. Cl.[7] .............................. H01P 1/10; H01H 1/24; H02B 1/24; H02J 1/24

(52) U.S. Cl. ........................................ 333/262; 307/112

(58) Field of Search ................................. 333/262, 103, 333/104, 22 R, 235, 17.2, 202; 307/112, 117; 327/503; 455/78, 266, 326; 324/322

(56) References Cited

U.S. PATENT DOCUMENTS

| | | | | | |
|---|---|---|---|---|---|
| 4,678,929 | A | * | 7/1987 | Alpaiwalla et al. | 307/112 |
| 4,712,020 | A | * | 12/1987 | Basile | 307/117 |
| 4,782,298 | A | * | 11/1988 | Arakawa et al. | 324/322 |
| 4,883,984 | A | * | 11/1989 | Kess | 327/503 |
| 4,956,621 | A | | 9/1990 | Heckaman et al. | |
| 4,965,539 | A | * | 10/1990 | Korber, Jr. | 333/202 |
| 5,276,411 | A | * | 1/1994 | Woodin et al. | 333/22 R |
| 5,300,900 | A | * | 4/1994 | Bellantoni | 333/17.2 |
| 5,789,995 | A | * | 8/1998 | Minasi | 333/103 |
| 5,793,269 | A | | 8/1998 | Ervasti et al. | |
| 6,014,066 | A | * | 1/2000 | Harberts et al. | 333/104 |
| 6,035,185 | A | * | 3/2000 | Dobrovolny et al. | 455/266 |
| 6,115,594 | A | * | 9/2000 | Pozdeev et al. | 455/326 |
| 6,487,395 | B1 | * | 11/2002 | Durec et al. | 455/78 |

* cited by examiner

*Primary Examiner*—Patrick Wamsley
(74) *Attorney, Agent, or Firm*—George A. Herbster

(57) ABSTRACT

An RF switch includes first and second diodes characterized by an intrinsic region. Pin diodes and nip diodes are examples of such diodes with intrinsic regions. The diodes are stacked with facing first connections. A bias conductor extends from the first connections.

23 Claims, 5 Drawing Sheets

RF SWITCH INCLUDING DIODES WITH INTRINSIC REGIONS

BACKGROUND OF THE INVENTION

1. Field of the Invention

This invention generally relates to radio frequency switching systems and more specifically to radio frequency switching systems with diodes that have an intrinsic region.

2. Description of Related Art

Many mechanical and solid state switching systems exist for controlling RF signal transmissions. These include diverse solid state radio frequency (RF) switches that are preferable because they are fast acting, minimize noise and switching transients and have no mechanical structure. Although different components, such as field effect transistors, have been utilized in solid state switches, solid state radio frequency switches with pin diodes are popular. These switches serve a number of applications over a wide range of RF frequencies.

A number of circuits utilize pin diodes for radio frequency switching. For example, U.S. Pat. No. 4,956,621 (1990) to Heckaman discloses a three-state, two-output RF power divider utilizing multiple pin diodes to selectively couple RF power from an input port to one of two output ports by controllably biasing a shunting action of the three pin diodes. In this configuration while two pin diodes operate as a shunt, the remaining diode remains in open circuit condition.

U.S. Pat. No. 4,883,984 (1989) to Kess discloses a pin diode switch with a series circuit of two oppositely polarized pin diodes and with a control current supplied to the junction between the two pin diodes through a collector-emitter transistor path and through an inductor. This configuration is stated to avoid any need to generate any high reverse bias in order to avoid limiting the amplitude of the radio frequency voltage.

U.S. Pat. No. 5,793,269 (1998) to Ervasti et al. discloses a regulated filter. This filter utilizes pin diodes as switches for an RF signal. Two pin diodes having a common cathode connection.

As known, a pin diode has a p-n junction with an intrinsic region. A nip diode has an n-p junction with an intrinsic region. Each is an example of a diode with an intrinsic region. Diodes with intrinsic regions have two important, yet antiethical characteristics. The first characteristic is junction capacitance; the second, current capacity of a diode. To reduce the junction capacitance for enabling diode performance at higher frequencies, it is necessary to reduce the area of the intrinsic region. However, reducing the area of the intrinsic region reduces the current capacity.

One solution to this problem has been to configure multiple pin or nip diodes in series. For example, if two pin diodes connect in series, the net capacitance is halved without reducing the current capacity. However, circuits utilizing pairs of pin diodes generally include a conductive path of some finite length between common anode or cathode connections. Any such path introduces an inductive reactance that increases with frequency. Inductive reactance introduces leakage when the pin or nip diodes are conducting thereby adversely affecting the isolation the pin or nip diode switch provides. The same solution can be applied to nip diodes with corresponding results.

Therefore, what is needed is a radio frequency switch that uses a diode with an intrinsic region and operates over a wide range of frequencies. In a first mode the switch should act as a perfect conductor for isolation. In the second mode the switch should act as an open circuit.

SUMMARY

Therefore it is an object of this invention to provide a low loss switch for a wide range of radio frequencies that includes pin or nip diodes.

It is another object of this invention to provide a low loss pin or nip diode switch for a wide range of radio frequencies that provide a high degree of isolation.

Yet another object of this invention to provide a low loss pin or nip diode switch for a wide range of radio frequencies that can be used in a shunt circuit path with low loss and high isolation characteristics.

Yet still another object of this invention to provide a low loss pin or nip diode radio frequency switch that minimizes losses due to connector lengths.

In accordance with this invention, a solid state switching assembly comprises first and second diodes having intrinsic regions. Each diode has a first connection and second connection. The diodes are stacked with the first connections in proximity. The stacked diodes collectively define a package envelope. A bias conductor connects to the first connections of the stacked diodes and extends externally of the package envelope. Consequently a bias signal can be applied to the bias conductor to control the conductivity through the switching assembly with essentially a zero-length path between the first connections.

In accordance with another aspect of this invention a solid state switching circuit controls the transfers of RF signals from an RF signal source to an RF load. The circuit includes a heat and RF signal conducting support member. First and second diodes with intrinsic regions and with first and second connections are stacked with facing first connections in close proximity. The stacked diodes define a package envelope. A second connection in the first diode attaches to the support member. A bias conductor connects to the first connections and extends externally of the package envelope. A bias signal can be applied to the bias conductor to control the transfer of RF signals between the support member and the second connection of the second diode.

In accordance with yet another aspect of this invention, a method for forming an RF switching circuit including first and second diodes with intrinsic regions and first and second connections and a bias conductor having a predefined length includes positioning the first and second diodes in corresponding orientations spaced by a distance that is approximately two times the predefined length. A conductor having a length of approximately two times predefined length is attached to the first connections. The second diode is then folded onto the first diode with the first connections in a facing relationship. Portions of the conductor coextensive with the first connections then are attached together and constitute a bias conductor of the predefined length.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
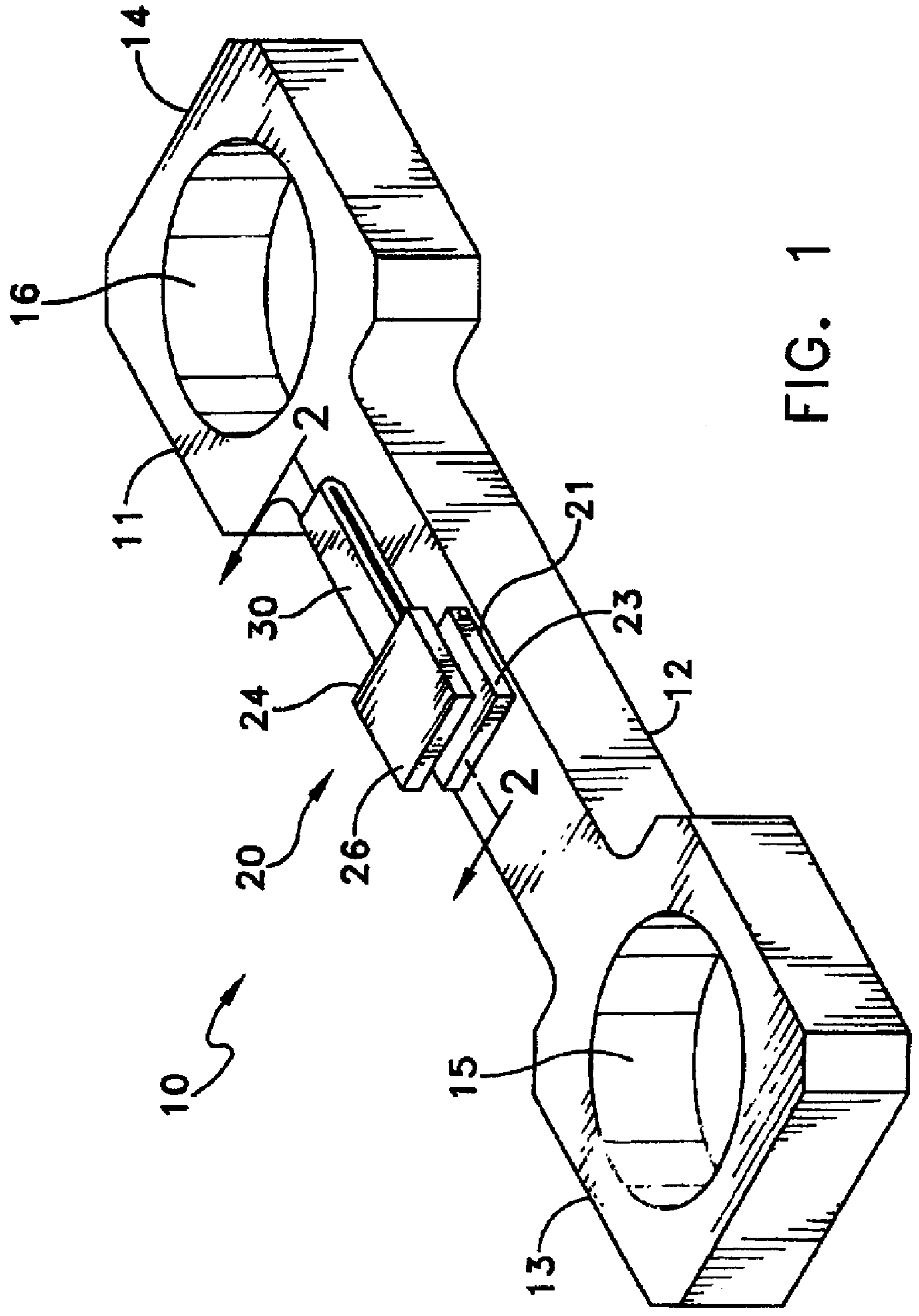
FIG. 1 is a perspective view of a radio frequency subassembly including a pin diode switching assembly in accordance with one aspect of this invention.
Figure 2:
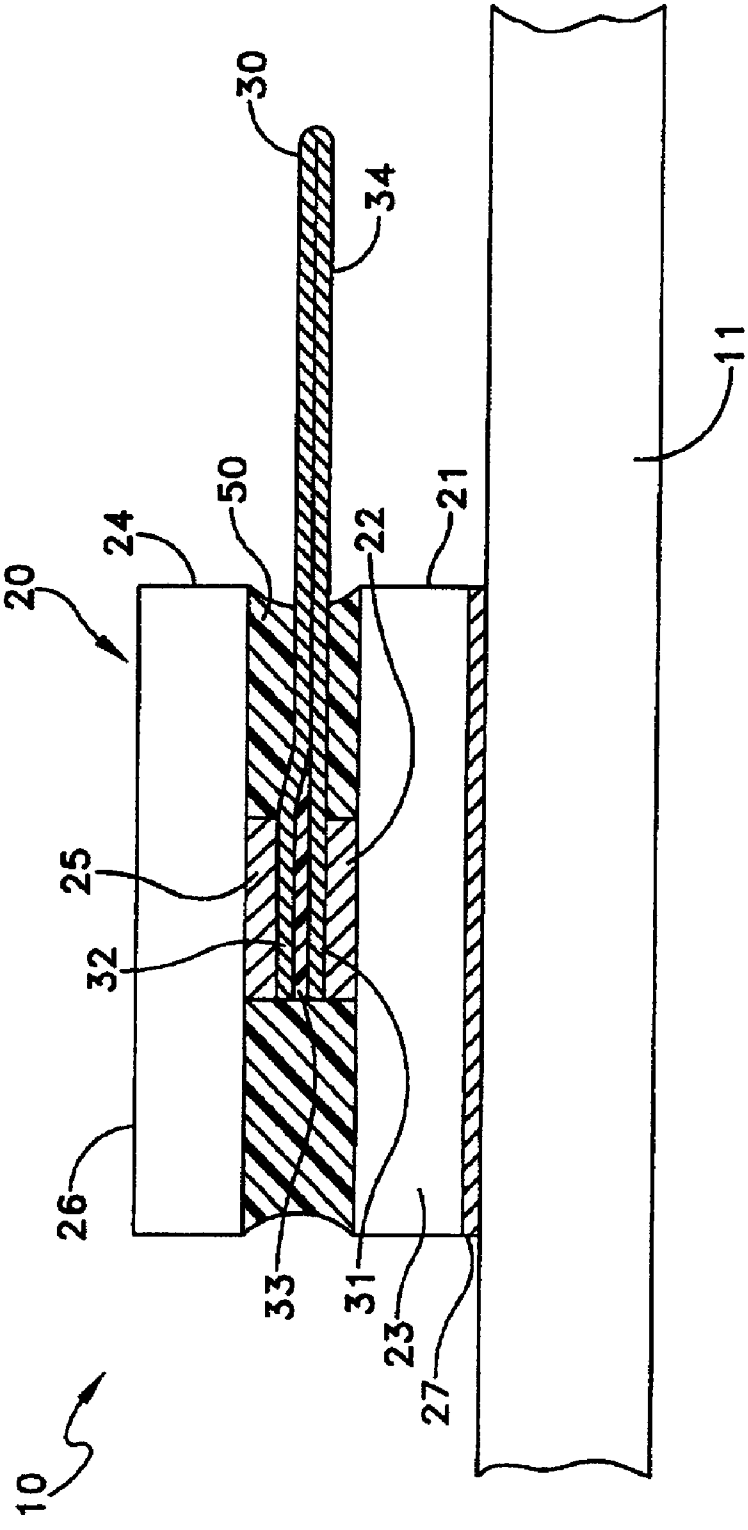
FIG. 2 is a cross-sectional view taken along lines 2—2 in FIG. 1.

FIGS. 1 and 2 depict a specific embodiment of a radio frequency (RF) assembly 10 that includes ground return 11. The ground return 11 includes a central member 12 and end fittings 13 and 14 with mounting apertures 15 and 16, respectively. The apertures 15 and 16 facilitate the attachment of the ground return 11 to ground fittings in an RF circuit (not shown, but known in the art) to make intimate contact with the end fittings 13 and 14.

An RF switching assembly 20 of this invention includes diodes with intrinsic regions in the nature of a first pin diode 21 having an anode 22 as a first connection and a cathode 23 as a second connection. A second pin diode 24 includes an anode 25 as a first connection and a cathode 26 as a second connection. As particularly shown in FIG. 2, the RF switching assembly 20 attaches to the ground return 11 by a layer of conductive adhesive or similar material such as an esthetic solder layer 27 between the ground return 11 and the cathode 23.

Still referring to FIGS. 1 and 2, the second pin diode 24 is inverted with respect to the first pin diode 21 such that the anodes 22 and 25 face each other. A bias conductor 30 has two ends 31 and 32 that bond to the anodes 22 and 25, respectively. In addition the two end portions 31 and 32 are bonded together, the bonding method being determined by the composition of the bias conductor 30. For example, if the bias conductor 30 is composed of a noble metal, such as gold, the bonding material 33 can be a conductive epoxy. For copper, the bonding material could be solder. Still other bonding materials or techniques can be applied for attaching bias conductors of other materials to the anode connections of any specific pin diode.

FIG. 2 depicts a pin diode package in which the edges of the cathodes 23 and 26 define a portion of a package envelope. The bias conductor 30 extends externally of that envelope to an end 34 thereby to provide a connection for the application of a dc bias voltage from a control.

Figure 3:
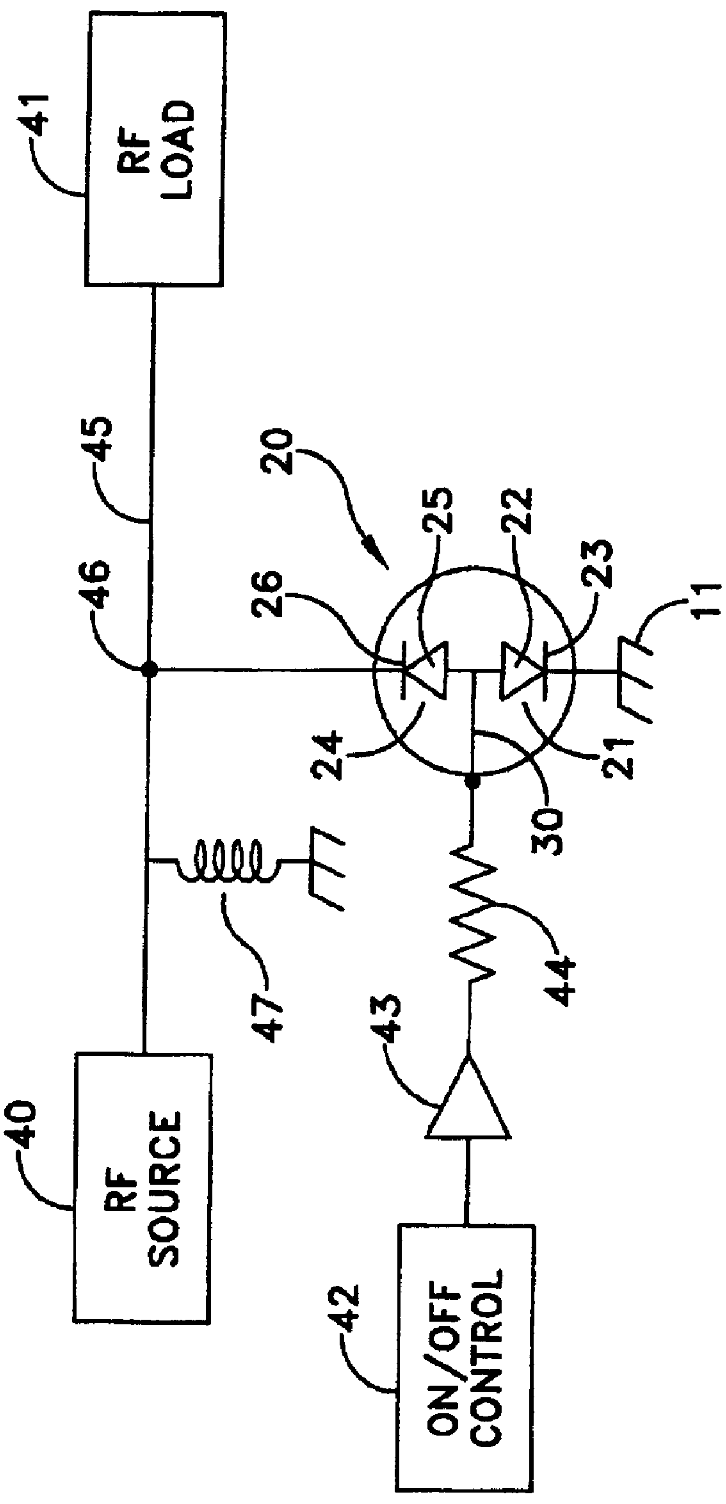
FIG. 3 is a circuit schematic of an RF circuit including a switching circuit as shown in FIG. 1.

FIG. 3 depicts one application of the RF switching assembly 20 in a radio frequency circuit that includes an RF source 40, an RF load 41 and an ON/OFF control 42. A buffer amplifier 43 and resistor 44 connect the ON/OFF control 42 to the bias conductor 30. The cathode 23 of the pin diode 21 attaches to the ground return 11. The cathode 26 of the pin diode 24 attaches to an RF path 45 intermediate the RF source 40 and RF load 41 at a junction 46. An inductor 47 provides a dc return for any dc signal generated by the ON/OFF control 42.

When the RF switching assembly 20 connects to the RF signal path 45, the total distance between the RF source 40 and the cathode 26 through the junction 46 is selected to be one-quarter wavelength ($\lambda/4$). The length of the path from the junction 46 to the RF load is selected to minimize any impedance discontinuities.

Assuming that the ON/OFF control is energized, a dc current flows from the bias conductor 30 through the pin diodes 21 and 24 and returns to ground through the inductor 47 and the ground return 11, respectively. This biases both the pin diodes 21 and 24 into a conducting relationship. When the pin diodes 21 and 24 conduct, the cathode 26 is essentially at an RF ground potential. With a path to the RF source of length $\lambda/4$, the RF source 40 "sees" an open circuit so no RF energy passes to the RF load. The construction of the RF switching assembly 20 enables the length of the path from the RF source 40 to the cathode 26 to be predicted with reasonable certainty.

When the ON/OFF control 42 turns off the pin diodes 21 and 24, the pin diodes are in an open condition so the impedance across the RF switching assembly 20 is infinite. Consequently the RF source 40 "sees" the characteristic impedance of the RF load 41 and energizes the RF load 41.

Thus when the ON/OFF control 42 is ON, the RF source 40 and RF load 41 are isolated. When the ON/OFF control 42 is OFF, the RF source 40 and RF load 41 connect through a characteristic impedance and minimize any RF losses that might otherwise occur. With this configuration an RF switch can operate over a range from 30 MHz to more than 3,000 MHz.

Figure 4:
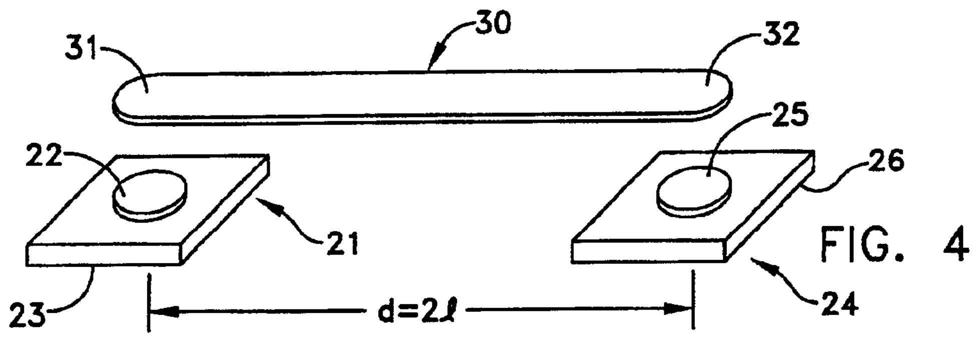
FIGS. 4 through 8 depict various steps of a method for constructing a switching circuit as shown in FIGS. 1 and 2.

FIGS. 4 through 8 depict a method of making the RF switching assembly 20. FIG. 4 depicts the two pin diodes 21 and 24 with the anodes 22 and 25 facing upward. Assuming it is desirable that the distance from the center of the anodes to the end 34 of the bias conductor 30 shown in FIG. 2 is l, the pin diodes 21 and 24 are spaced so the center-line distance between the anodes 22 and 25, d, is twice the predefined distance; i.e., d=2l.

FIG. 4 depicts a bias conductor 30 of a thin strip of a noble or other conductive material with end portions 31 and 32 positioned over the anodes 22 and 25, respectively. As shown, the end portions 31 and 32 are shaped to conform to the edges of the anodes 22 and 25 for obtaining a maximum contact area, although such complete overlayment is not necessary.

Figure 5:
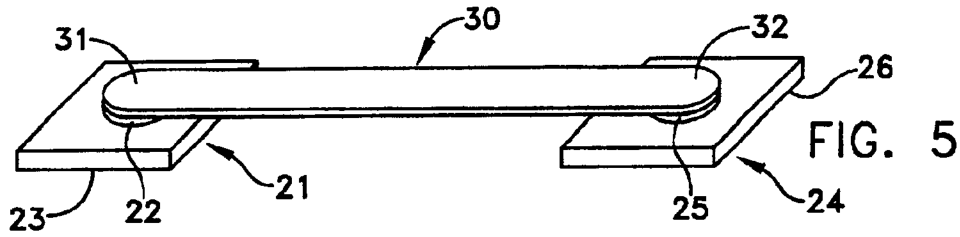

FIG. 5 represents the step of attaching the bias conductor 30 to the pin diodes 21 and 24 by a soldering or other bonding process. More specifically, in FIG. 5 the end portions 31 and 32 attach to the anodes 22 and 25, respectively. At this point an sub-assembly exists.

Figure 6:
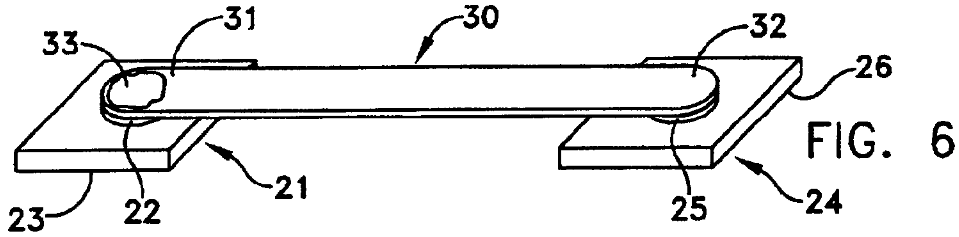

FIG. 6 depicts the sub-assembly of FIG. 5 with the addition of a material 33 to the end portion 31. In this particular embodiment nothing is applied to the end portion 32, although other bonding techniques may require such an application.

Figure 7:
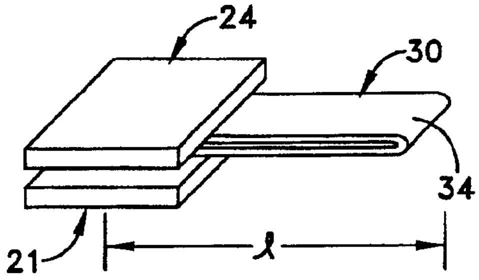

When the preparation shown in FIG. 6 has been completed, the pin diode 24 then is folded over onto the pin diode 21 as shown in FIG. 7. This produces a folded bias conductor 30 with the end portion 34. This loop may be pressed flat. In other applications, a portion of or the entire length of the conductor may be pressed or bonded such that when the folding operation of FIG. 7 is complete the loop portions of the bias conductor are affixed as a solid conductor.

Figure 8:
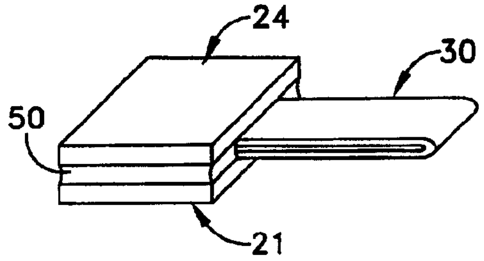

In a preferred embodiment, after the folding operation of FIG. 7 and the bonding of the end portions 31 and 32, the package as shown in FIG. 8 receives a non-conductive epoxy underfill 50 as also shown in FIG. 2. Once this assembly is complete, the RF switching assembly 20 can be applied to a ground return, such as the ground return 11, or to any other circuit component.

Figure 9:
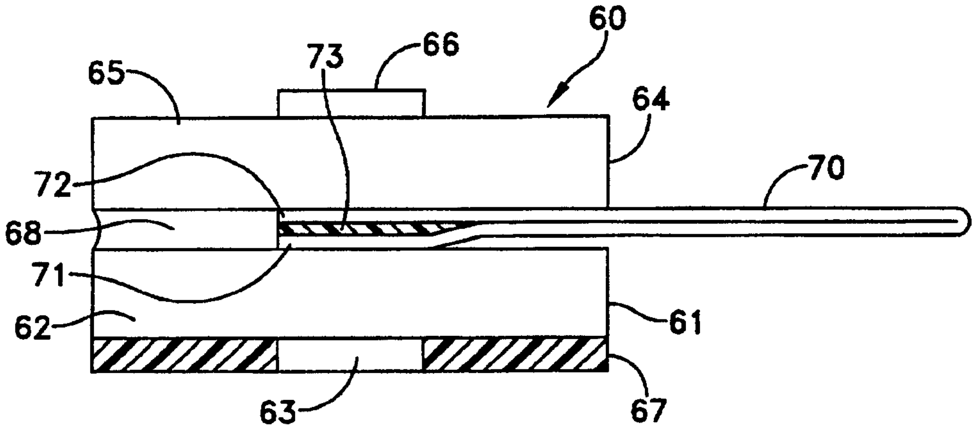
FIG. 9 is a cross-sectional view of a nip diode switching assembly in accordance with another aspect of this invention.

FIG. 9 depicts an RF switching assembly 60 in accordance with this invention that includes a first nip diode 61 having a cathode 62 as a first connection and an anode 63 as a second connection. A second nip diode 64 includes a cathode 65 as a first connection and anode 66 as a second connection. In use, the switching assembly 60 attaches to a ground return or other similar structure, like the solder layer 27 in FIG. 2, such as by a conductive adhesive or similar material interfacing between the anode 63 and the supporting structure. This embodiment also discloses an optional underfill 67 surrounding the anode 63. Such an underfill minimizes any contamination and fills the space between the cathode 62 and any supporting structure. Likewise, the volume defined between the cathodes 62 and 65 also may contain an underfill material 68.

Still referring to FIG. 9, the second nip diode 64 is inverted with respect to the first nip diode 61 such that the cathodes 62 and 65 face each other. A bias conductor 70, like the bias conductor 30, has two ends 71 and 72 that bond to the cathodes 62 and 65, respectively. In this embodiment the ends 71 and 72 only partially overlie the cathodes 62 and 65. A bonding material 73 bonds the two end portions 71 and 72 together, the bonding material 73 and method again being dependent upon the composition of the bias conductor 70.

Figure 10:
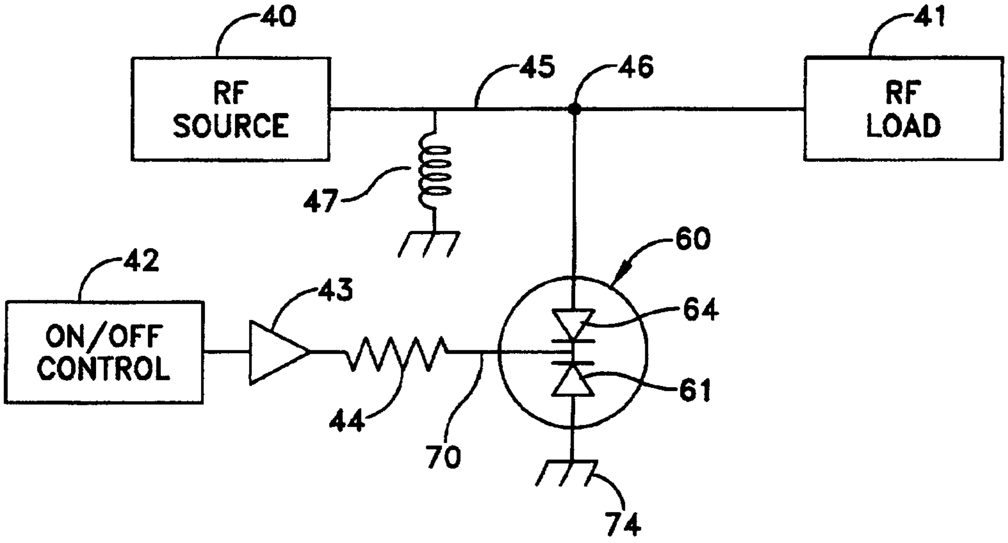
FIG. 10 is a circuit schematic of an RF circuit including a switching circuit as shown in FIG. 9.

This RF switching assembly 60 can be substituted directly for the RF switching assembly 20 in FIG. 3. FIG. 10 depicts such a substitution and elements in FIG. 10 that are the same as the elements in FIG. 3 are denoted with like reference numerals. Thus in FIG. 10, a radio frequency circuit includes the RF source 40, RF load 41 and ON/OFF control 42. The buffer amplifier 43 and resistor 44 connect the ON/OFF control 42 to the bias conductor 70. With nip diodes, however, the voltage on the bias conductor 70 shifts between a ground potential and a negative potential. The anode 63 of the first nip diode 61 attaches to a ground return represented by a ground symbol 74. The anode 66 of the second nip diode 64 attaches to the RF path 45 intermediate the RF source 40 an RF load 41 at a junction 46. The inductor 47 provides a DC path from the output of the ON/OFF control 42 to through the nip diode 64. The other DC path is from the ground return directly through the nip diode 61 to the ON/OFF control 42.

Assuming that the signal from the ON/OFF control at a negative value, the nip diodes 61 and 64 conduct. The anode 64 is essentially at RF ground potential. With a $\lambda/4$ path length from the anode 64 to the RF source 40, the RF source 40 "sees" an open circuit so no RF energy passes to the RF load 41. When the ON/OFF control 42 is at a ground potential, it blocks conduction through the nip diodes 61 and 64. The resulting open-circuit state of the RF switching assembly 60 reflects as a minimum impedance condition so the RF source 40 "sees" the characteristic impedance of the RF load 41 and energizes the RF load 41.

Thus when the ON/OFF control 42 is off, the RF source 40 and RF load 41 are isolated. When the ON/OFF control 42 is on, the RF source 40 and RF load 41 connect through characteristic impedance and minimize any RF losses that might otherwise occur. Like the circuit in FIG. 3, this configuration of an RF switch can operate over a range from 30 MHz to more than 3,000 MHz.

In certain applications it may be preferable to select the pin diodes 21 and 24 or nip diodes 61 and 64 as matched components using electrical and mechanical criteria, although such matching is not necessary to the implementation of this invention. Matching the pin or nip diodes mechanically simplifies the manufacturing process as shown in FIGS. 4 through 8. Matching the pin or nip diodes electrically, may assure a more predictable response. One specific matching electrical parameter is terminal impedance. Matching this parameter may minimize any uneven heating and therefore any uneven operation of a pair of pin or nip diodes in the configurations disclosed in FIGS. 1 through 9.

As will now be apparent, an RF switch made in accordance with the structure shown in either of FIGS. 2 or 9 meets the several objectives of this invention. Either of the switching assemblies 20 and 60 is adapted for use as a shunt in a shunt configuration that reduces RF losses and produces a high degree of isolation. More specifically, the intimate contact between the facing anodes for pin diodes and facing cathodes for nip diodes provides an extremely short path between the diodes thereby minimizing any inductance. Consequently when the switch is conductive, it appears as a minimal resistance and presents an essentially open circuit at a location that is one-quarter wavelength from a cathode connection. This open circuit provides the high level of isolation. When the diodes are not conductive, the configuration minimizes capacitance thereby to increase the operating frequencies that can be reached before any significant leakage occurs. Consequently in this position the circuit acts as a low loss conductive switch at a position one-quarter wavelength from the cathode connection.

This invention has been disclosed in terms of certain embodiments. For example, the invention has been described in terms of pin and nip diodes having a rectangular configuration. It has been described with specific bonding techniques that are particularly applicable for certain materials. The invention is equally applicable, however, to RF switching assemblies that use pin or nip diodes of different configurations and with other bonding techniques. More generally, this invention may be implemented with diodes having the basic characteristics of pin and nip diodes namely an intrinsic region. Moreover, it will be apparent that many other modifications can be made to the disclosed apparatus without departing from this invention. Therefore, it is the intent of the appended claims to cover all such variations and modifications as come within the true spirit and scope of this invention.

What is claimed as new and desired to be secured by Letters Patent of the United States is:

1. A solid state switching assembly comprising:

A) first and second diodes, each diode being characterized by an intrinsic region and having an anode and cathode, one of said anode and cathode constituting a first connection and the other of the anode and cathode constitution a second connection, said diodes being stacked with facing first connections in close proximity and said first and second diodes defining a package envelope, and B) a bias conductor connected to each of said first connections and extending externally of the package envelope whereby a bias signal applied to said bias conductor controls conductivity through said switching assembly with essentially a zero-length path between said proximate first connections.

2. A solid state switching assembly as recited in claim 1 additionally comprising a heat connecting RF ground structure attached to said second connection of said first diode whereby said RF structure and said second connection of said second diode constitute RF connection points for said switching assembly.

3. A solid state switching assembly as recited in claim 2 wherein said bias conductor comprises a single conductor strip formed in a loop with the ends thereof intermediate said counterfacing first connections and said loop extends externally of the package envelope.

4. A solid state switching assembly as recited in claim 3 wherein said first and second diodes comprise first and second physically matched pin diodes and said first and second diode connections comprise the pin diode anode and cathode, respectively.

5. A solid state switching assembly as recited in claim 4, wherein said first and second pin diodes are electrically matched.

6. A solid state switching assembly as recited in claim 5 wherein said bias conductor strip is composed of a ribbon conductor.

7. A solid state switching assembly as recited in claim 3 wherein said first and second diodes comprise first and second physically matched nip diodes and said first and second connections for each of said nip diodes comprise the nip diode cathode and anode, respectively.

8. A solid state switching assembly as recited in claim 7 wherein said first and second nip diodes are electrically matched.

9. A solid state switching assembly as recited in claim 8 wherein said bias conductor strip is composed of a ribbon conductor.

10. A solid state switching assembly as recited in claim 1 wherein said bias conductor comprises a single conductive strip formed in a loop with the ends thereof intermediate said first connections and said loop extending externally of the package envelope.

11. A solid state switching assembly as recited in claim 10 wherein said first and second diodes are physically matched.

12. A solid state switching assembly as recited in claim 11 wherein said first and second diodes are electrically matched.

13. A solid state switching assembly as recited in claim 10 wherein said bias conductor is composed of a ribbon conductor.

14. A solid state switching circuit for controlling the transfer of RF signals from an RF signal source, said circuit comprising:

A) a heat and RF signal conducting support member,

B) first and second diodes, each of said diodes being characterized by an intrinsic region and having an anode and cathode, one of said anode and cathode constituting a first connection and the other of the anode and cathode constituting second connection, said diodes being stacked with facing first connections is close proximity to define a package envelope, said second connection of said first diode being connected to said support member, and C) a bias conductor connected to each of said first connections and extending externally of the package envelope whereby a bias signal can be applied to said bias conductor thereby to control the transfer of RF signals between said support member and said second connection of said second diode with essentially a zero-length path between said proximate first connections.

15. A solid state RF switching circuit as recited in claim 14 wherein said bias conductor comprises a single conductor strip formed in a loop with the ends thereof intermediate said counterfacing first connections and said loop extending externally of the package envelope.

16. A solid state RF switching circuit as recited in claim 15 wherein each of said diodes comprises a pin diode in which said first and second connections comprise the pin diode anode and cathode, respectively.

17. A solid state RF switching circuit as recited in claim 16 wherein said first and second pin diodes are physically matched.

18. A solid state RF switching circuit as recited in claim 16 wherein said first and second pin diodes are electrically matched.

19. A solid state RF switching circuit as recited in claim 16 wherein said bias conductor strip is composed of a ribbon conductor.

20. A solid state RF switching circuit as recited in claim 15 wherein each of said diodes comprises a nip diode in which said first and second connections comprise the nip diode cathode and anode, respectively.

21. A solid state RF switching as recited in claim 20 wherein said first and second nip diodes are physically matched.

22. A solid state RF switching circuit as recited in claim 20 wherein said first and second nip diodes are electrically matched.

23. A solid state RF switching circuit as recited in claim 20 wherein said bias conductor strip is composed of a ribbon conductor.

* * * * *